(12) United States Patent
Kitamura et al.

(10) Patent No.: US 6,947,158 B1
(45) Date of Patent: Sep. 20, 2005

(54) PRINT OUTPUT CONTROL APPARATUS, PRINT OUTPUT CONTROL METHOD, AND COMPUTER-READABLE RECORDING MEDIUM RECORDING PROGRAM HAVING PRINT OUTPUT CONTROL CAPABILITY

(75) Inventors: Yoshio Kitamura, Kanagawa (JP); Yuji Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/484,668

(22) Filed: Jan. 18, 2000

(30) Foreign Application Priority Data

Jan. 28, 1999 (JP) .............................. P11-020333

(51) Int. Cl.[7] .......................... G06F 13/00; G06F 3/12; G06K 15/02
(52) U.S. Cl. .................... 358/1.15; 358/358; 358/1.14; 358/1.13
(58) Field of Search ............................ 358/1.15, 1.14, 358/1.13, 1.16, 1.18, 1.9

(56) References Cited

U.S. PATENT DOCUMENTS 5,963,216 A * 10/1999 Chiarabini et al. ......... 345/660
6,108,009 A * 8/2000 Nishikawa .................. 345/590
6,115,133 A * 9/2000 Watanabe ................... 358/1.15
6,580,521 B1 * 6/2003 Nishikawa et al. ......... 358/1.18

FOREIGN PATENT DOCUMENTS

JP          07325693 A  * 12/1995  ............. G06F 3/14

* cited by examiner

Primary Examiner—Douglas Tran
(74) Attorney, Agent, or Firm—Bell, Boyd & Lloyd LLC

(57) ABSTRACT

A print output control apparatus, a print output control method, and a computer-readable recording medium storing a computer program having print output control capabilities. Print preview is displayed by use of print data to enhance user interface. A print output control apparatus comprises: a printer driver for converting data in the file into print data recognizable by the printer; a print data storage unit for storing the print, data supplied from the printer driver; a window display unit, executed by the printer driver, for acquiring the print data from the print data storage unit and displaying, onto a display device coupled to the computer, a preview window having a preview box for displaying the print data and a print data processing box operable by a user for changing the print data; and a print data processing unit, executed by the window display unit, for changing the print data when the user operates the print data processing box.

8 Claims, 7 Drawing Sheets

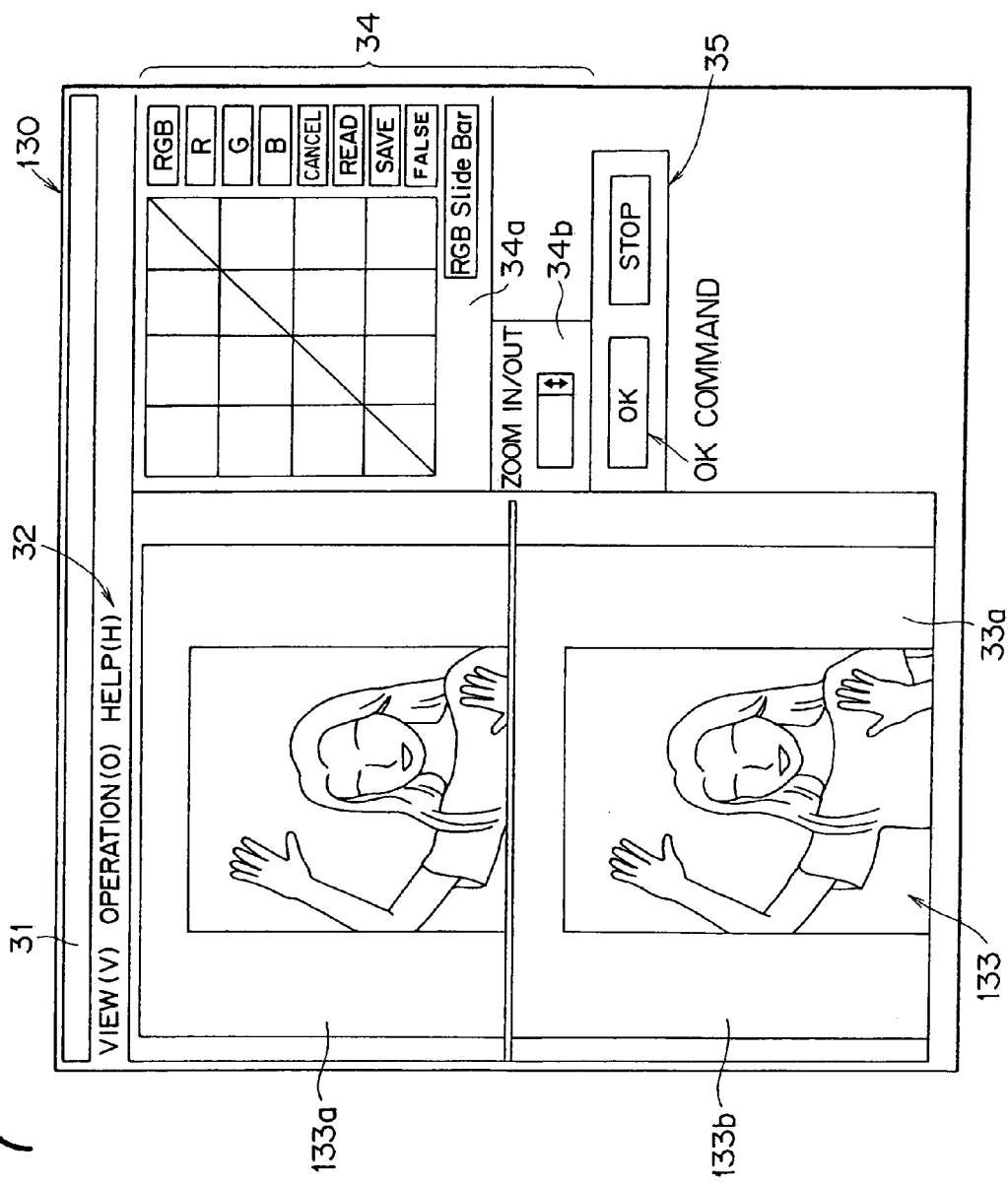

PRINT OUTPUT CONTROL APPARATUS, PRINT OUTPUT CONTROL METHOD, AND COMPUTER-READABLE RECORDING MEDIUM RECORDING PROGRAM HAVING PRINT OUTPUT CONTROL CAPABILITY

BACKGROUND OF THE INVENTION

The present invention relates generally to a print output control apparatus, a print output control method, and a recording medium recording this method that enhance user interface.

Generally, peripheral devices connected to a computer are controlled by device drivers. Especially, printers are controlled by printer drivers. For example, in printing a file (or document) of image data or text data created by an application, the printer driver for that printer is called from the application program.

To be specific, when the user selects "Print" from the menu of an application program, a dialog box associated with the printing appears on the display screen. The user sets print-associated parameters through the dialog box and then enters a print command, upon which the specified image data for example are outputted on the printer. The printer driver displays the dialog box through which the user sets paper size, print pages, and the number of copies to be printed for example. Thus, by use of the dialog box, the user makes setting for desired print outputs.

Some application programs have a print image drawing capability. This capability allows the user to preview a print image of before actually performing printing on the printer. If the preview image is different from what the user desires, for example, if the image is found outside the range of a specified paper, then the user adjusts the image or changes the content of the print file through the application program by stopping the current printing sequence.

However, since the above-mentioned print image drawing capability is for displaying the image of a print result, the preview image may differ from the result actually outputted from the printer. To be more specific, the widths of fonts and characters provided by application programs and operating systems may differ from the widths of fonts and characters printed on printers. In addition, color matching may not be achieved between an image displayed on the display device and its counterpart printed on the printer. Color matching herein denotes that there is complete matching in color as viewed from users between the displayed image and the printed image.

Consequently, if the user determines good an image to be printed by checking it through the preview window but the printed image is turned out not what the user desired, the user must readjust at much expense in time and effort the contents of the image file until the desired printed image is obtained.

SUMMARY OF THE INVENTION

It is therefore an object of the present invention to provide a print output control apparatus, a print output control method, and a computer-readable recording medium recording a program having a print output control capability that enhance user interface by displaying a preview of a print image by use of its print data.

In carrying out the invention and according to one aspect thereof, there is provided a print output control apparatus for outputting content of a file created by an application program to a printer coupled to a computer, comprising: a printer driver for converting data in the file into print data recognizable by the printer; a print data storage means for storing the print data supplied from the printer driver; a window display means, executed by the printer driver, for acquiring the print data from the print data storage means and displaying, onto a display device coupled to the computer, a preview window having a preview box for displaying the print data and a print data processing box operable by a user for changing the print data; and a print data processing means, executed by the window display means, for changing the print data when the user operates the print data processing box.

In carrying out the invention and according to another aspect thereof, there is provided a print output control method for outputting content of a file created by an application program to a printer coupled to a computer, comprising the steps of: converting data in the file into print data recognizable by the printer; storing the print data; displaying, onto a display device coupled to the computer, a preview window having a preview box for displaying the print data and a print data processing box operable by a user for changing the print data; changing the print data when the user operates the print data processing box, storing the changed print data, and displaying the changed print data into the preview box; and if requested for printing by the user, executing printing on the printer on the basis of the stored print data.

In carrying out the invention according to still another object thereof, there is provided a computer-readable recording medium storing a computer program having a print output control capability for outputting content of a file created by an application program onto a printer coupled to a computer, the computer program having capabilities of: converting data in the file into print data recognizable by the printer; storing the print data; displaying, onto a display device coupled to the computer, a preview window having a preview box for displaying the print data and a print data processing box operable by a user for changing the print data; changing the print data when the user operates the print data processing box, storing the changed print data, and displaying the changed print data into the preview box; and if requested for printing by user, executing printing on the printer on the basis of the stored print data.

According to the above-mentioned constitution, print data obtained by converting the data of the file are displayed in the preview box. On the basis of the print data displayed in the preview box, the user can adjust the print data through the print data processing box. Displaying and adjustment of the print data make substantially the same the print result displayed on the screen and the print result actually obtained on the printer.

BRIEF DESCRIPTION OF THE DRAWINGS

These and other objects of the invention will be seen by reference to the description, taken in connection with the accompanying drawing, in which:

FIG. 7 is a diagram illustrating an example of another preview window to be displayed by the window display means onto the display device in the print output control apparatus.

DETAILED DESCRIPTION OF PREFERRED EMBODIMENTS

This invention will be described in further detail by way of an example with reference to the accompanying drawings.

It should be understood that the following embodiments are preferred by this invention and therefore limited in technology in various preferable manners. However, the scope of this invention is not limited to these embodiments unless otherwise specifically noted as such in the following description.

Figure 1:
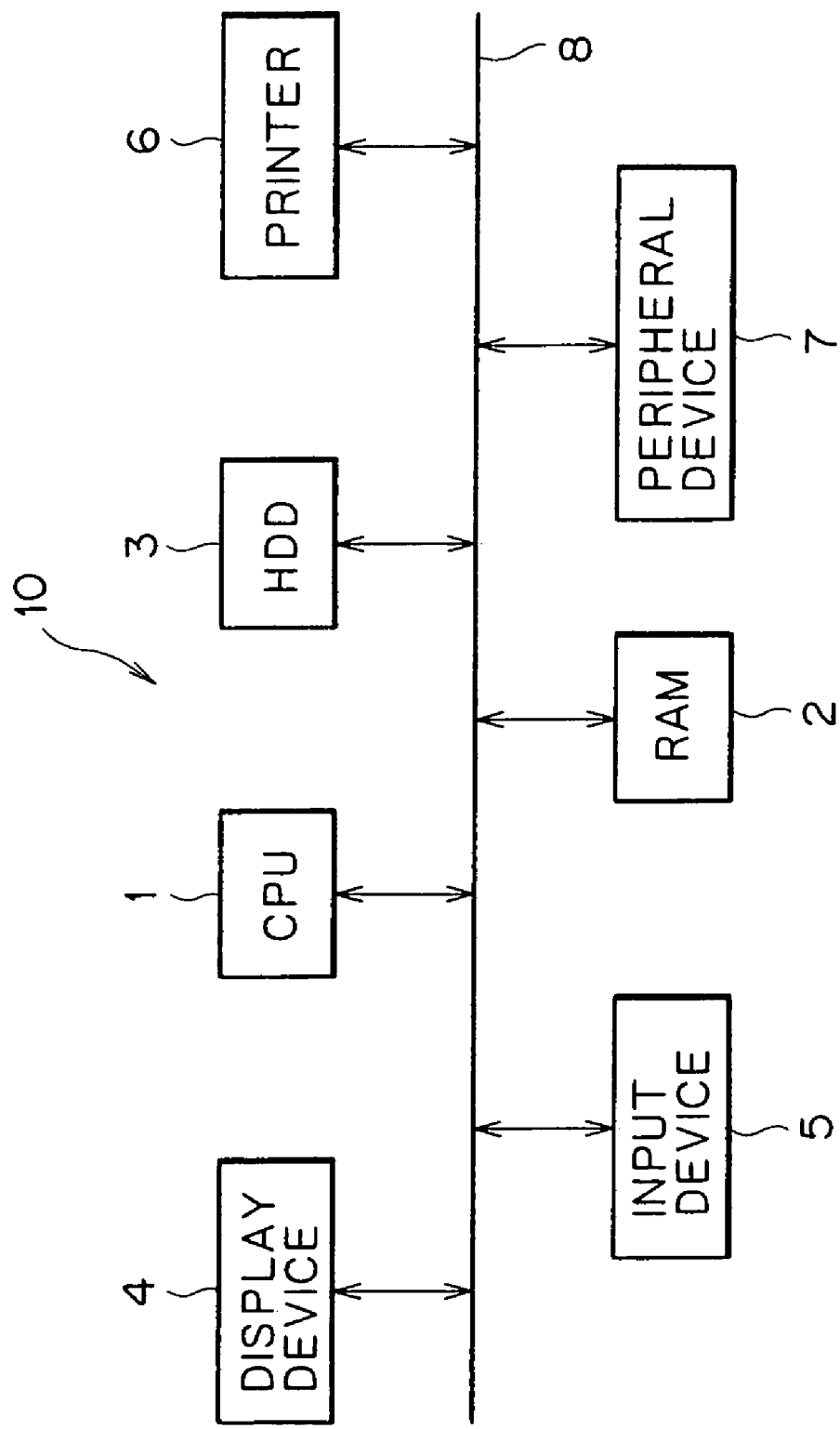
FIG. 1 is a block diagram illustrating a computer system applicable to a print output control apparatus according to invention.

Now, referring to FIG. 1, there is shown a preferred hardware configuration of a computer system applicable to a print output control apparatus practiced as a first embodiment of the invention. The following describes this computer system denoted by reference numeral 10.

The computer system 10 comprises a CPU (Central Processing Unit) 1, a RAM (Random Access Memory) 2, which is an internal storage device, an HDD (Hard Disc Drive) 3, which is an external storage device, a display device 4, an input device 5, a printer 6, and a peripheral device 7. The CPU 1 has a capability of executing instructions that constitute a program. The RAM 2 temporarily stores the program being executed by the CPU 1 and the data for use in the execution. The HDD 3 has a capability of storing the operating system (OS) of the computer system, application programs, and drivers.

The display device 4 comprises a CRT (Cathode Ray Tube) or an LCD (Liquid Crystal Display) for example. The input device 5 comprises a keyboard and a pointing device such as a mouse for example. The display device 4 and the input device 5 transfer data between the computer system 10 and the user. The printer 6 has a capability of printing a file created by an application program for example. The peripheral device 7 comprises an auxiliary storage device such as a floppy disc drive, an optical disc drive, or a hard disc drive, or a communication device for example. These hardware devices making up the computer system 10 are interconnected through a bus 8 for data transfer.

Figure 2:
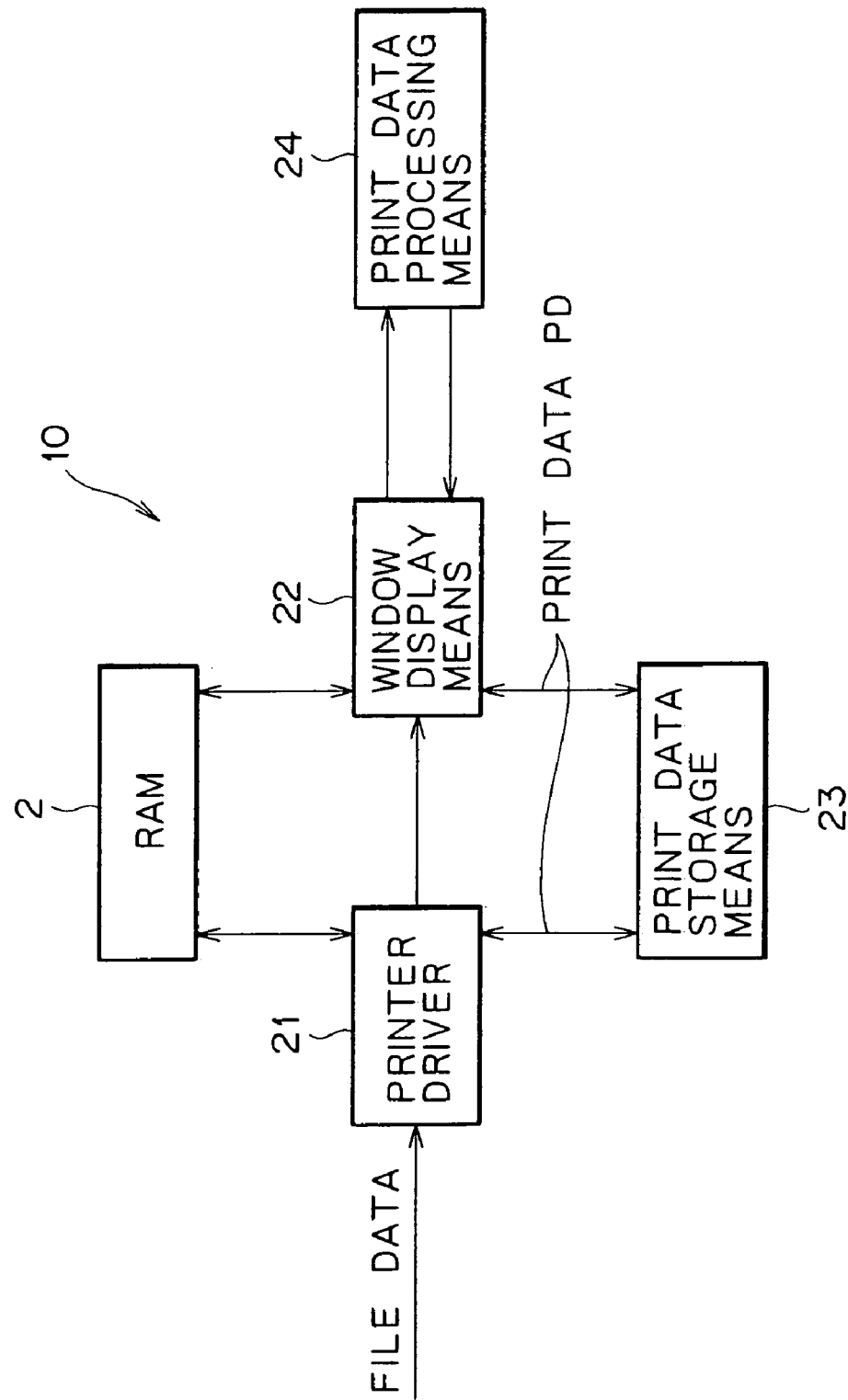
FIG. 2 is a diagram illustrating a software configuration indicative of a preferred embodiment of the print output control apparatus according to the invention.

FIG. 2 illustrates a software configuration for realizing a print output control apparatus according to the invention denoted by reference numeral 10.

The print output control apparatus 10 comprises a printer driver 21, a window display means 22, a print data storage means 23, and a print data processing means 24. These components are all stored on the HDD 3 shown in FIG. 1. The printer driver 21 controls the operation of the printer 6 and converts file data created by an application program into print data PD. The printer driver 21 sends the prepared print data PD to the print data storage means 23.

Figure 3:
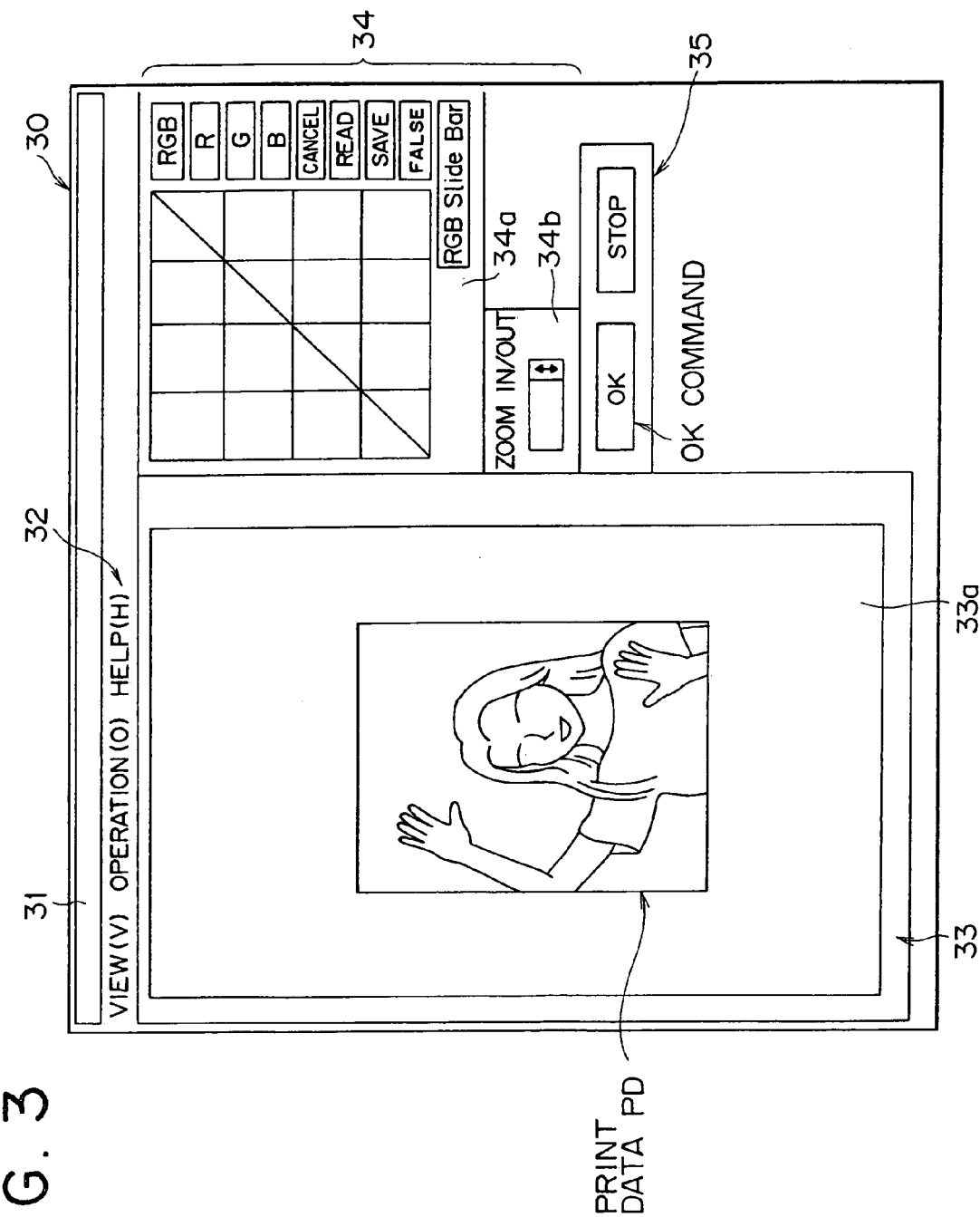
FIG. 3 is a diagram illustrating one example of a preview window to be displayed by window display means onto a display device in the print output control apparatus according to the invention.

The window display means 22 is a part (for example, a DLL (Dynamic Link Library)) of an application program or the operating system of this computer system that displays a preview window 30 as shown in FIG. 3. The window display means 22 is executed upon request from the printer driver 21. The window display means 22 also has a capability of acquiring the format and name of a file, to be printed, stored in the RAM 2, and print data PD from the print data storage means 23.

The print data processing means 24 is a part (for example, a DLL) of an application program for processing the print data in a predetermined manner or of the operating system. The print data processing means 24 provides capabilities of executing zoom-in/zoom-out, edge enhancement, and color adjustment of image data to be printed, and setting of the font and size of text data to be printed. It should be noted that the printer driver 21, the window display means 22, and the print data processing means 24 are executed by the CPU 1 shown in FIG. 1. In addition, these components can be incorporated in the computer system 10 as the programs stored on a recording medium.

FIG. 3 illustrates the preview window displayed by the window display means 22. In the figure, the preview window 30 is composed of a title bar 31, menu bar 32, a preview box 33, a print data processing box 34, and a command box 35. The title bar 31 displays the name of the printer 6 on which the printing is to be performed and the name of the file to be printed for example. The menu bar 32 displays processing commands that the user can choose in the preview window 30.

The preview box 33 displays the image of a print result to be outputted from the printer 6. In this box, print data PD are drawn on a paper preview 33a of a predetermined size. The print data processing box 34 changes the setting of the print data PD displayed in the preview box 33 according to a command issued by the user by operating the mouse for example. FIG. 3 illustrates an example in which the print data processing box 34 is composed of a color adjustment box 34a in which a tone curve graph is shown and a zoom-in/out box 34b for changing the size of the print data PD.

The command box 35 is composed of "OK" command button and "STOP" command button. When the user selects "OK" command after operating the print data processing box 34, the printer 6 starts printing. On the other hand, when the user selects "STOP" command, the preview window 30 closes to display the window of the application program for example.

Figure 4:
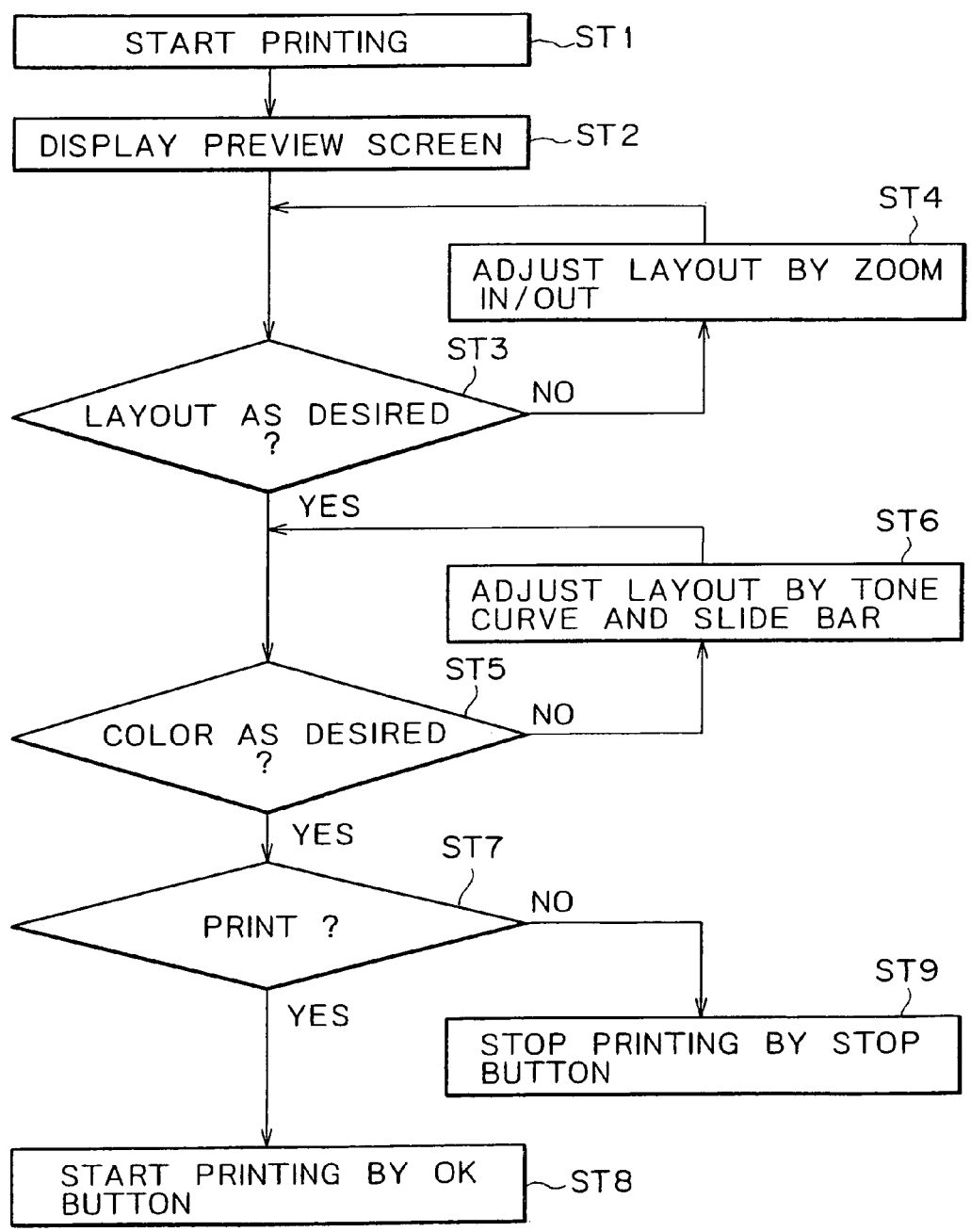
FIG. 4 is a flowchart indicative of one example of an operation to be performed by user in printing.

FIG. 4 shows an exemplary operation to be performed by the user when printing. The following describes one example of printing method with reference to FIGS. 1 through 4. First, the user commands from the application program that a predetermined file be printed (ST1). Then, the preview window 30 as shown in FIG. 3 appears on the display device 4 (ST2). Checking the display of the preview box 33, the user determines whether a desired layout can be obtained or not (ST3). If the user wants to modify the layout, the user does so by use of the zoom-in/out box 34b (ST4).

On the other hand, if the user is satisfied with the layout, then the user determines whether the color of the print data PD drawn in the preview box 33 is as desired or not (ST5). If the user wants to change the color, the user does so by operating the color adjustment box 34a (ST6). When the desired color is displayed in the preview box 33, the user determines whether to print as shown in the preview box (ST7). To print as shown, the user selects the "OK" command, upon which a print result is outputted from the printer 6 (ST8). If the user selects "STOP" command button, the print processing is halted (ST9).

Figure 5:
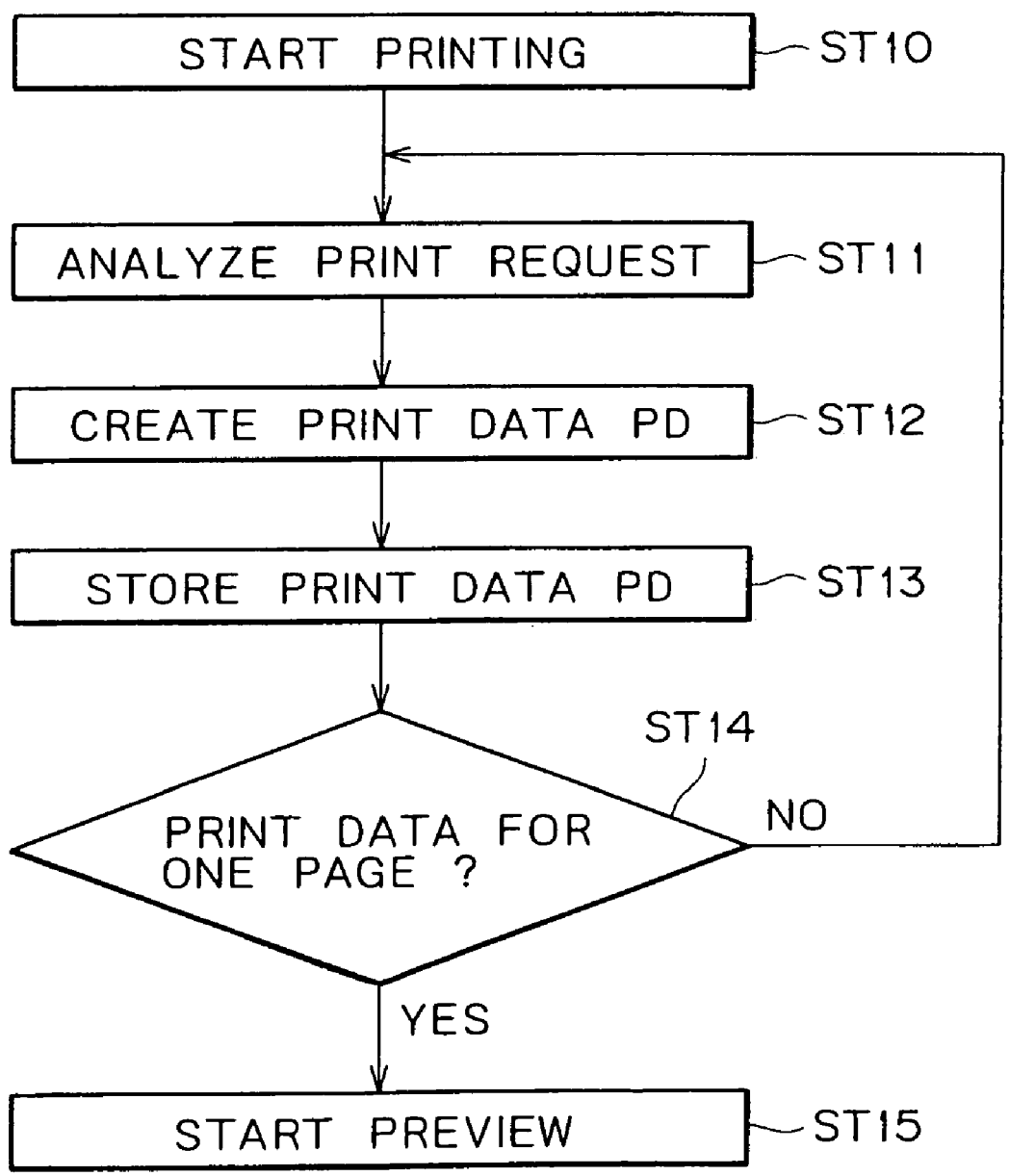
FIG. 5 is a flowchart indicative of a preferred embodiment of a print output control method according to the invention.
Figure 6:
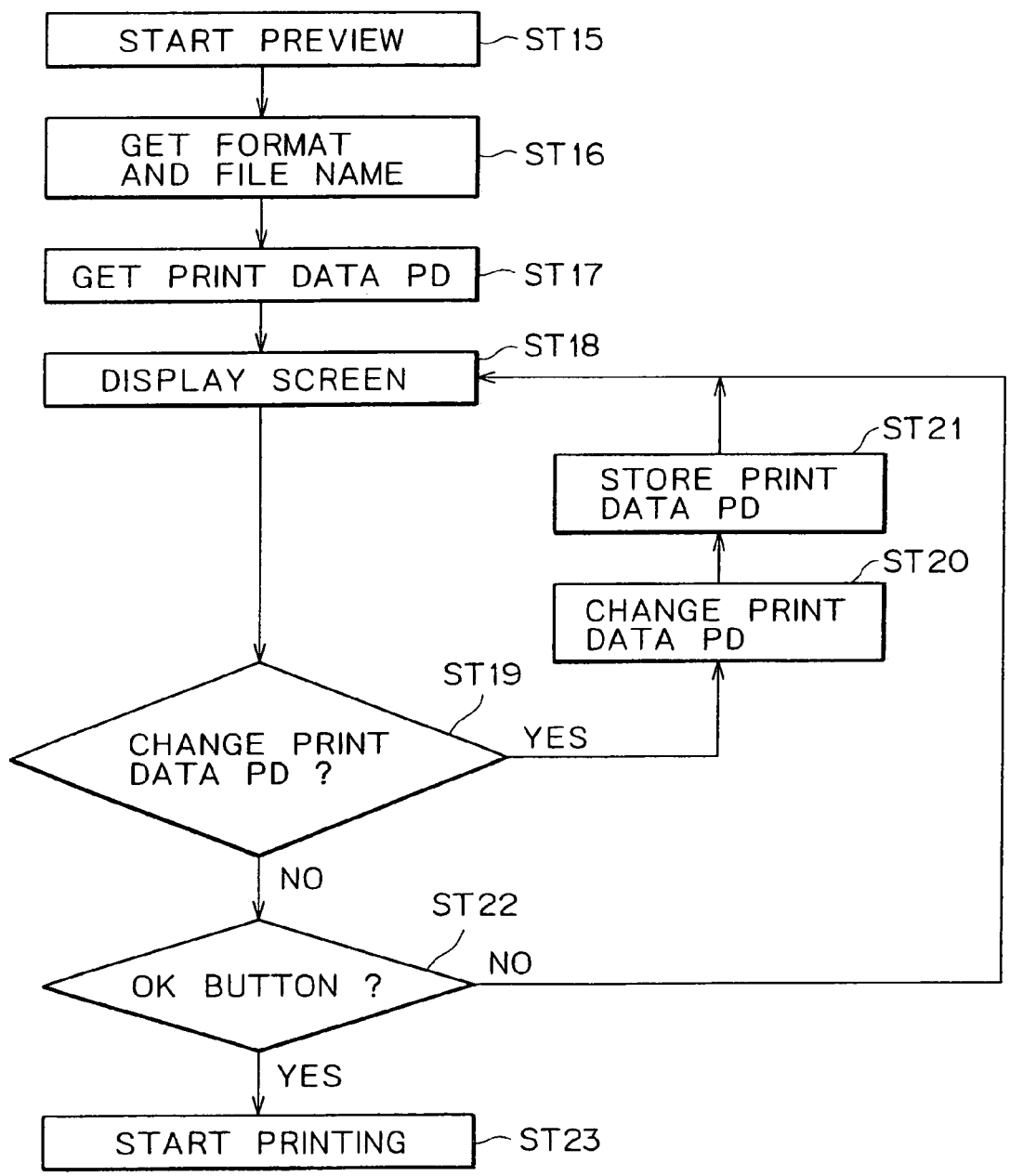
FIG. 6 is a flowchart continued from FIG. 5.

With reference to FIG. 4, an example of the operation up to the printing by the user of a predetermined file was described. The following describes one example of a print output control method to be used when the user performs a print operation. FIGS. 5 and 6 are flowcharts indicative of the operation of a print output control method practiced as one preferred embodiment of the invention. The following description is made with reference to FIGS. 1 through 6. Now, referring to FIG. 5, when a print command is issued from the application program (ST10), a print request signal is transferred from the CPU 1 shown in FIG. 1 to the printer driver 21 shown in FIG. 2.

The printer driver 21 analyzes the print request signal (ST11) and recognizes the file name, format, and data of the file to be printed. Then, the printer driver 21 transfers the file name and the file format to the RAM 2. At the same time, the printer driver 21 converts the file data to be printed into the print data PD printable by the printer 6 (ST12) and stores the print data PD into the print data storage means 23 (ST13) The printer driver 21 repeats these operations until the print data PD equivalent to one page of the file to be printed are stored in the print data storage means 23 (ST14). Then, when one page of the PD data has been stored in the print data storage means 23, the printer driver 21 activates the window display means 22 to start a preview screen (ST15).

Next, referring to FIG. 6, the window display means 22 shown in FIG. 2 reads the file format and the file name from the RAM 2 (ST16). Further, the window display means 22 reads the print data PD from the print data storage means 23 (ST17). Then, on the basis of the print data PD and the file format, the window display means 22 draws the print data PD in the preview box 33 shown in FIG. 3 and draws the file name on the title bar 31 for example. In addition, the window display means 22 draws the print data processing box 34 that corresponds to capabilities of processing the setting of the print data PD and the setting of the file format prepared in the print data processing means 24. Then, the preview window 30 as shown in FIG. 3 appears on the display device 4 (ST18).

When the user has changed the print data PD by operating the print data processing box 34 shown in FIG. 3 (ST19), the print data processing means 24 shown in FIG. 2 is executed and the print data PD are changed (ST20). Then, the window display means 22 stores the changed print data PD into the print data storage means 23 (ST21) and displays the changed print data PD onto the preview box 33 shown in FIG. 3 (ST18). The window display means 22 repeats these operations until the user obtained the desired print data PD.

Then, if the user selects "OK" command shown in the command box 35 (ST22), the window display means 22 shown in FIG. 2 comes to an end, upon which the printer driver 21 recognizes through a synchronous object the processing end of the window display means 22. The printer driver 21 then reads the print data PD from the print data storage means 23 and outputs the print data PD to the printer 6 after processing the print data PD if necessary (ST23).

According to the above-mentioned embodiment, when the user requests, from the application program, for printing, the preview window 30 appears. Through the preview window 30, the user can adjust the print result as desired. Furthermore, the adjustment of the print result is not for displaying or changing the file created by the application program; it is for displaying or changing the print data PD created by the printer driver 21. As such, the user can view through the display device 4 the print content which is generally the same as the print result on the printer. If the user adjusts and changes the displayed preview, the changes made are correctly reflected on the print result. Namely, the user can achieve color matching and font matching between displayed image and print image to realize so-called WYSIWYG (What You See Is What You Get), thereby enhancing user interface.

FIG. 7 shows another embodiment of the preview window. The following describes only the differences from the above-mentioned first embodiment with the description of the common portions skipped. A preview window 130 shown in FIG. 7 has two preview boxes 133a and 133b for example. The first preview window 133a displays print data PD in pre-change state for example. The second preview window 133b displays print data PD in post-change state.

At this moment, the print data storage means 23 shown in FIG. 2 stores two pieces of print data PD before and after change. The window display means 22 can get these two pieces of print data PD. Thus, unlike the first embodiment, the second embodiment allows the user to perform color adjustment for example while checking the print data PD in the states before and after change, thereby enhancing the efficiency of print adjustment.

It should be understood that the present invention is not limited to the above-mentioned embodiments. For example, if there are two or more pages to be printed, provision of a check box "Same Setting Apply to Following" in the preview window 30 shown in FIG. 3 allows the user to specify only a particular page, the following pages being adjusted in the same manner. If a check box "No Preview" is provided for example, the user can set so that no preview feature is displayed.

In the print data processing box 34 of the preview window 30 shown in FIG. 3, the user performs color adjustment by operating the tone curve. It will be apparent that a slide bar for example may be operated for color adjustment. As shown in FIG. 7, the preview window 130 has two preview boxes 133a and 133b. It will be apparent that more than two preview boxes may be arranged.

As described and according to the invention, print preview is displayed by use of print data, thereby enhancing user interface.

While the preferred embodiments of the present invention have been described using specific terms, such description is for illustrative purposes only, and it is to be understood that changes and variations may be made without departing from the spirit or scope of the appended claims.

What is claimed is:

1. A print output control apparatus for outputting content of a file created by an application program to a printer coupled to a computer, comprising:
    a printer driver for converting data in said file into print data recognizable by said printer;
    a print data storage means for storing said print data supplied from said printer driver;
    a window display means, executed by said printer driver, for acquiring said print data from said print data storage means and displaying, onto a display device coupled to said computer, a preview window having a preview box for displaying said print data and a print data processing box operable by a user for changing said print data; and
    a print data processing means, executed by said window display means, for changing said print data when the user operates said print data processing box.

2. The print output control apparatus according to claim 1, wherein said print data processing means includes a capability of adjusting color of said print data.

3. The print output control apparatus according to claim 1, wherein said print data processing means includes a capability of adjusting print size of said print data.

4. The print output control apparatus according to claim 1, wherein said window display means having a capability of displaying said print data before being changed through said print data processing box and said print data after being changed through said print data processing box.

5. A print output control method for outputting content of a file created by an application program to a printer coupled to a computer, comprising the steps of:
- converting data in said file into print data recognizable by said printer;
- storing said print data;
- displaying, onto a display device coupled to said computer, a preview window having a preview box for displaying said print data and a print data processing box operable by a user for changing said print data;
- changing said print data when the user operates said print data processing box, storing the changed print data, and displaying said changed print data into said preview box; and
- if requested for printing by the user, executing printing on said printer on the basis of the stored print data.

6. The print output control method according to claim 5, wherein, when said print data is processed in a predetermined manner for change, the print data before change and the print data after change are stored and these pieces of print data are displayed in said preview box.

7. A computer-readable recording medium storing a computer program having a print output control capability for outputting content of a file created by an application program onto a printer coupled to a computer, said computer program having capabilities of:
- converting data in said file into print data recognizable by said printer;
- storing said print data;
- displaying, onto a display device coupled to said computer, a preview window having a preview box for displaying said print data and a print data processing box operable by a user for changing said print data;
- changing said print data when the user operates said print data processing box, storing the changed print data, and displaying said changed print data into said preview box; and
- if requested for printing by user, executing printing on said printer on the basis of the stored print data.

8. The computer-readable recording medium according to claim 7, wherein said computer program further having capabilities of, when said print data is processed in a predetermined manner for change, storing the print data before change and the print data after change and displaying these pieces of print data into said preview box.

* * * * *